(12) United States Patent
Dharmaji

(10) Patent No.: US 9,009,754 B2
(45) Date of Patent: *Apr. 14, 2015

(54) METHOD AND APPARATUS FOR ALTERNATE CONTENT SCHEDULING ON MOBILE DEVICES

(71) Applicant: Goldspot Media, Inc., Sunnyvale, CA (US)

(72) Inventor: Srinivasa Dharmaji, Cupertino, CA (US)

(73) Assignee: Goldspot Media, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/216,510

(22) Filed: Mar. 17, 2014

(65) Prior Publication Data

US 2014/0201785 A1 Jul. 17, 2014

Related U.S. Application Data

(63) Continuation of application No. 13/949,056, filed on Jul. 23, 2013, now Pat. No. 8,707,351, which is a continuation of application No. 11/842,635, filed on Aug. 21, 2007, now Pat. No. 8,522,269, which is a continuation-in-part of application No. 11/828,204, filed on Jul. 25, 2007.

(60) Provisional application No. 60/834,039, filed on Jul. 29, 2006.

(51) Int. Cl.
*H04N 7/10* (2006.01)
*H04N 21/262* (2011.01)
(Continued)

(52) U.S. Cl.
CPC .......... *H04N 21/26241* (2013.01); *G06F 15/02* (2013.01); *H04H 20/106* (2013.01); *H04H 60/31* (2013.01); *H04N 7/163* (2013.01); *H04N 7/173* (2013.01); *H04N 7/17318* (2013.01); *H04N 21/25891* (2013.01); *H04N 21/26258* (2013.01); *H04N 21/4126* (2013.01); *H04N 21/41407* (2013.01); *H04N 21/4307* (2013.01); *H04N 21/4331* (2013.01); *H04N 21/44016* (2013.01); *H04N 21/44222* (2013.01); *H04N 21/4532* (2013.01); *H04N 21/458* (2013.01); *H04N 21/6181* (2013.01); *H04N 21/6543* (2013.01); *H04N 21/6582* (2013.01); *H04N 21/812* (2013.01); *H04N 21/00* (2013.01);
(Continued)

(58) Field of Classification Search
USPC .......................... 725/32–36; 455/404.1, 414.1
See application file for complete search history.

(56) References Cited

U.S. PATENT DOCUMENTS 5,155,591 A 10/1992 Wachob
5,319,455 A 6/1994 Hoarty et al.
(Continued)

*Primary Examiner* — Nicholas Corbo
(74) *Attorney, Agent, or Firm* — Michael A. Glenn; Perkins Coie LLP

(57) ABSTRACT

Alternate digital content is inserted into mobile devices with a method and apparatus that comprises an alternate content scheduler, an alternate content reporter, and a micro-splicer. The alternate content scheduler further comprises a mobile network interface for interaction with a mobile data and broadcast network, a micro-splicer interface for interfacing with a micro-splicer, a rulebook that is shared with the network which provides the rules for alternate content scheduling, a preference provisioning module comprising an alternate content scheduler library for storing user or network preferences, a scheduler for providing tight synchronization between original program content and alternate content, and a metric recording interface to an alternate content reporter. The micro-splicer works in tandem with the alternate content scheduler to render synchronized display of alternate multimedia content on the mobile device.

18 Claims, 7 Drawing Sheets

(51) Int. Cl.

| | | |
|---|---|---|
| *G06F 15/02* | (2006.01) | |
| *H04H 20/10* | (2008.01) | |
| *H04H 60/31* | (2008.01) | |
| *H04N 7/16* | (2011.01) | |
| *H04N 7/173* | (2011.01) | |
| *H04N 21/258* | (2011.01) | |
| *H04N 21/41* | (2011.01) | |
| *H04N 21/414* | (2011.01) | |
| *H04N 21/43* | (2011.01) | |
| *H04N 21/433* | (2011.01) | |
| *H04N 21/44* | (2011.01) | |
| *H04N 21/442* | (2011.01) | |
| *H04N 21/45* | (2011.01) | |
| *H04N 21/458* | (2011.01) | |
| *H04N 21/61* | (2011.01) | |
| *H04N 21/6543* | (2011.01) | |
| *H04N 21/658* | (2011.01) | |
| *H04N 21/81* | (2011.01) | |
| *H04N 21/00* | (2011.01) | |
| *H04L 29/06* | (2006.01) | |
| *H04L 12/24* | (2006.01) | |

(52) U.S. Cl.
CPC ........... *H04L 65/604* (2013.01); *H04L 65/607* (2013.01); *H04L 65/80* (2013.01); *H04L 41/5009* (2013.01); *H04L 41/5032* (2013.01)

(56) References Cited

U.S. PATENT DOCUMENTS

| | | |
|---|---|---|
| 5,874,986 A | 2/1999 | Gibbon et al. |
| 5,907,321 A | 5/1999 | Grossman et al. |
| 6,006,257 A | 12/1999 | Slezak |
| 6,446,261 B1 | 9/2002 | Rosser |
| 6,698,020 B1 | 2/2004 | Zigmond et al. |
| 6,820,277 B1 | 11/2004 | Eldering et al. |
| 6,834,195 B2 | 12/2004 | Brandenberg et al. |
| 6,880,123 B1 | 4/2005 | Landsman et al. |
| 6,977,667 B1 | 12/2005 | Burke |
| 6,990,630 B2 | 1/2006 | Landsman et al. |
| 7,028,327 B1 | 4/2006 | Dougherty et al. |
| 7,068,719 B2 | 6/2006 | Lin et al. |
| 7,093,277 B2 | 8/2006 | Perlman |
| 7,103,904 B1 | 9/2006 | Blackketter et al. |
| 7,149,958 B2 | 12/2006 | Landsman et al. |
| 7,152,237 B2 | 12/2006 | Flickinger et al. |
| 7,155,663 B2 | 12/2006 | Landsman et al. |
| 7,185,353 B2 | 2/2007 | Schlack |
| 7,228,555 B2 | 6/2007 | Schlack |
| 7,376,414 B2 | 5/2008 | Engstrom |
| 7,720,432 B1 | 5/2010 | Colby et al. |
| 2001/0025378 A1 | 9/2001 | Sakamoto et al. |
| 2002/0092019 A1 | 7/2002 | Marcus |
| 2002/0103919 A1 | 8/2002 | Hannaway |
| 2002/0144263 A1 | 10/2002 | Eldering et al. |
| 2002/0194592 A1 | 12/2002 | Tsuchida et al. |
| 2003/0033157 A1 | 2/2003 | Dempski et al. |
| 2003/0149975 A1 | 8/2003 | Eldering et al. |
| 2003/0163810 A1 | 8/2003 | Iijima |
| 2004/0003398 A1 | 1/2004 | Donian et al. |
| 2004/0015608 A1 | 1/2004 | Ellis et al. |
| 2004/0025174 A1 | 2/2004 | Cerrato |
| 2004/0111465 A1 | 6/2004 | Chuang et al. |
| 2004/0123097 A1 | 6/2004 | Ranjan |
| 2004/0158865 A1 | 8/2004 | Kubler et al. |
| 2004/0171399 A1 | 9/2004 | Uchida et al. |
| 2004/0194131 A1 | 9/2004 | Ellis et al. |
| 2004/0244035 A1 | 12/2004 | Wright et al. |
| 2005/0050577 A1 | 3/2005 | Westbrook |
| 2005/0097624 A1 | 5/2005 | Salo et al. |
| 2005/0107109 A1 | 5/2005 | Gunaratnam et al. |
| 2005/0245241 A1 | 11/2005 | Durand et al. |
| 2006/0100928 A1 | 5/2006 | Walczak |
| 2006/0130119 A1 | 6/2006 | Candelore et al. |
| 2006/0130121 A1 | 6/2006 | Candelore et al. |
| 2006/0168616 A1 | 7/2006 | Candelore |
| 2007/0055985 A1 | 3/2007 | Schiller et al. |
| 2007/0061203 A1 | 3/2007 | Elis et al. |
| 2007/0061204 A1 | 3/2007 | Ellis et al. |
| 2007/0079325 A1 | 4/2007 | de Heer |
| 2007/0113243 A1 | 5/2007 | Brey |
| 2007/0157231 A1 | 7/2007 | Eldering et al. |
| 2008/0040743 A1 | 2/2008 | Dharmaji |
| 2008/0192736 A1 | 8/2008 | Jabri et al. |
| 2008/0195664 A1 | 8/2008 | Maharajh et al. |
| 2008/0201225 A1 | 8/2008 | Maharajh et al. |
| 2008/0207137 A1 | 8/2008 | Maharajh et al. |
| 2009/0076904 A1 | 3/2009 | Serena |
| 2009/0204487 A1 | 8/2009 | Cansler et al. |
| 2009/0319375 A1 | 12/2009 | Dharmaji |

Alternate Content Scheduler – Network Push

METHOD AND APPARATUS FOR ALTERNATE CONTENT SCHEDULING ON MOBILE DEVICES

CROSS REFERENCE TO RELATED APPLICATIONS

This application is a continuation of U.S. patent application Ser. No. 13/949,056, filed Jul. 23, 2013, which is a continuation of U.S. patent application Ser. No. 11/842,635 entitled Method and Apparatus for Alternate Content Scheduling on Mobile Devices, filed Aug. 21, 2007, which is a continuation-in-part of U.S. patent application Ser. No. 11/828,204, entitled Micro-Splicer for Inserting Alternate Content to a Content Stream on a Handheld Device, filed Jul. 25, 2007, which claims priority from U.S. provisional patent application Ser. No. 60/834,039, entitled Micro Splicer in Mobile Devices, filed Jul. 29, 2006, all of which are assigned to a common assignee, and which are hereby incorporated by reference for all that they contain.

BACKGROUND OF THE INVENTION

1. Technical Field

The invention generally relates to the providing of content to a mobile device and more specifically to the providing of alternate content based on identified preferences to a mobile device.

2. Description of the Prior Art

The availability and growth of use of handheld, portable, mobile devices, such as the personal digital assistant (PDA) and the cell phone, generally referred to herein as handheld devices, is revolutionizing the digital multimedia content viewing experience of individuals. Because each handheld device is specific to an individual, it is possible to personalize and focus advertisements, and other alternate content, to specific individual, or groups of individuals, having targeted characteristics. Ideally, the advertisement for each individual should be tailored, or otherwise targeted, to fit the specific requirements of that specific individual. Therefore, it would be necessary to provide each individual with a specific advertising stream.

One problem that exists today in implementing such a scheme is that there is limited bandwidth available in systems, such as a point-to-point or multicast wireless broadcasting of digital multimedia content. Therefore, it is impractical to provide each individual with a specifically targeted stream that fits that individual's characteristics. This limits the possibility to include focused advertisements and alternate content that are targeted towards specific individuals or groups. This is due to the fact that there are a substantial number of focused advertisements that must be broadcast simultaneously to achieve the objective of focused advertising. In addition, there must be the added capability at each handheld device to identify and view the alternate content or advertisement that is specifically meant for that individual. Hence, even though the idea of providing focused advertisements and alternate content to target groups has been a desirable concept in the advertising to customers using handheld devices, it has not been possible to implement this efficiently. Therefore, the current practice for inserting advertisements for viewing on handheld devices is to insert them into the content stream by splicing the advertisement either by altering the stream or prior to a multicast transmission.

Many mobile device applications would benefit if preferential alternate content scheduling capability were provided, thus enabling the insertion of forced or profile based content. In view of the limitations of the prior art, it would be advantageous to provide such a system that provides alternate content for an identified period of time. It would be further advantageous if such content is rendered by the mobile media player. In such applications, the alternate content is stored on the mobile device ahead of insertion time, along with time-synchronized metadata, and is scheduled for buffering and subsequent rendering.

SUMMARY OF THE INVENTION

A presently preferred embodiment of the invention provides a method and apparatus for inserting alternate digital content into mobile devices. The invention, in one embodiment, comprises an alternate content scheduler, an alternate content reporter, and a micro-splicer. The alternate content scheduler further comprises a mobile network interface for interaction with a mobile data and broadcast network, a micro-splicer interface for interfacing with a micro-splicer, a rulebook that is shared with the network and that provides the rules for alternate content scheduling, a preference provisioning module comprising an alternate content scheduler library for storing user or network preferences, a scheduler for providing tight synchronization between original program content and alternate content, and a metric recording interface to an alternate content reporter. The micro-splicer works in tandem with the alternate content scheduler to render synchronized display of alternate multimedia content on the mobile device.

To support alternate content insertion applications the invention uses services of cellular data networks, mobile service provider networks, or mechanisms that are entitled to provide input or output (I/O) to mobile equipment. To achieve alternate content scheduling, the alternate content scheduler works in conformity with the principles or conditions defined by the mobile network.

One embodiment of the invention inserts advertisements onto the mobile device. Advertisements are transmitted and stored in the mobile device for insertion into the micro-splicer at an appropriate time. Though the method of transmission of the advertisements can vary depending on the transport characteristics of wireless data or broadcast networks, insertion of advertisement content is dependent on tight coupling of the micro-splicer and the alternate content scheduler. Inserting gateway, interstitial, bumper, or banner advertisements into the content buffer is an example of the interaction.

Another embodiment of the invention inserts preferential content, based on subscriber choices on the mobile device. Content obtained through transport channels or residing on the mobile device is inserted, based on subscriber preferences.

Another embodiment of the invention inserts public broadcast announcements into the program streams with appropriate metadata interactions. Emergency notifications are another form of forced alternate content that is inserted into the user display by network scheduled high priority content delivery, which is implemented by the alternate content scheduler, and which is executed by the micro-splicer.

Another embodiment of invention concerns mobile product placement where, in appropriate metadata notifications to the alternate content scheduler, placement of images or multimedia on the specified region of the display of the mobile device is triggered through interactions with the micro-splicer.

Another embodiment of invention enables mobilization of advertisements inserted into the network by making them mobile friendly with the insertion of targeted, e.g. contextual, location based, or behavior oriented, interactive segments around the advertisements that are embedded in the content streams. This involves the use of metadata for timing and synchronization, along with creation of these dynamic interactive segments during the time in which the specific advertisement is rendered. The alternate content scheduler, in tandem with the micro-splicer, achieves this by using predefined metadata made available in the content streams.

Another embodiment of invention provides advertisement fatigue control, which in essence regulates the number of times any given ad should be viewed by the user in a specified time period. Typically, ad inventory owners want to set the ad fatigue in the network, thereby limiting the number of times an ad is viewed by an user in a given time period. An alternate content scheduler helps in ad rotation, as well as fatigue control, through a rulebook that is shared between the network and the mobile device.

DETAILED DESCRIPTION OF THE INVENTION

A method and apparatus for inserting alternate digital content into mobile devices comprises an alternate content scheduler, an alternate content reporter, and a micro-splicer. The alternate content scheduler further comprises a mobile network interface for interaction with a mobile data and broadcast network, a micro-splicer interface for interfacing with a micro-splicer, a rulebook that is shared with the network and that provides rules for alternate content scheduling, a preference provisioning module comprising an alternate content scheduler library for storing user or network preferences, a scheduler for providing tight synchronization between original program content and alternate content, and a metric recording interface to an alternate content reporter. The micro-splicer works in tandem with the alternate content scheduler to render synchronized display of alternate multimedia content on the mobile device.

A presently preferred embodiment of the invention provides a mechanism for obtaining and scheduling alternate multimedia content broadcast to mobile devices over mobile broadcast or multicast networks. The invention is used as the basis for scheduling alternate digital content, such as advertisements, preference based alternate contents, banners, and localized public announcements, and emergency notifications to be rendered by the mobile media player. Public promotions can also be strategically deployed, based on the preferential alternate scheduling mechanism of the invention. Alternate content can be streamed through transport mechanisms, such as cellular data networks, wireless fidelity (WiFi) networks, or any mobile device input or output (I/O) mechanism. The alternate content is then synchronized for reproduction at the mobile terminal.

The alternate content scheduler coordinates all scheduling activities, either in conjunction with the mobile Tele-vision (TV) service software on the mobile device or independently. The invention disclosed herein is a continuation-in-part of U.S. patent application Ser. No. 11/828,204, entitled Micro-Splicer for Inserting Alternate Content to a Content Stream on a Handheld Device (hereinafter, the "'204 application"), which is assigned to a common assignee, and which is hereby incorporated by reference for all that it contains. The '204 application discloses a method and apparatus for inserting alternate digital content into multimedia content broadcast to mobile portable devices with tight synchronization and with tandem functioning of a micro-splicer with the alternate content scheduler. The micro-splicer accepts commands from the alternate content scheduler and executes the rules of content rendering in accordance with a rulebook definition in the mobile network.

Figure 1:
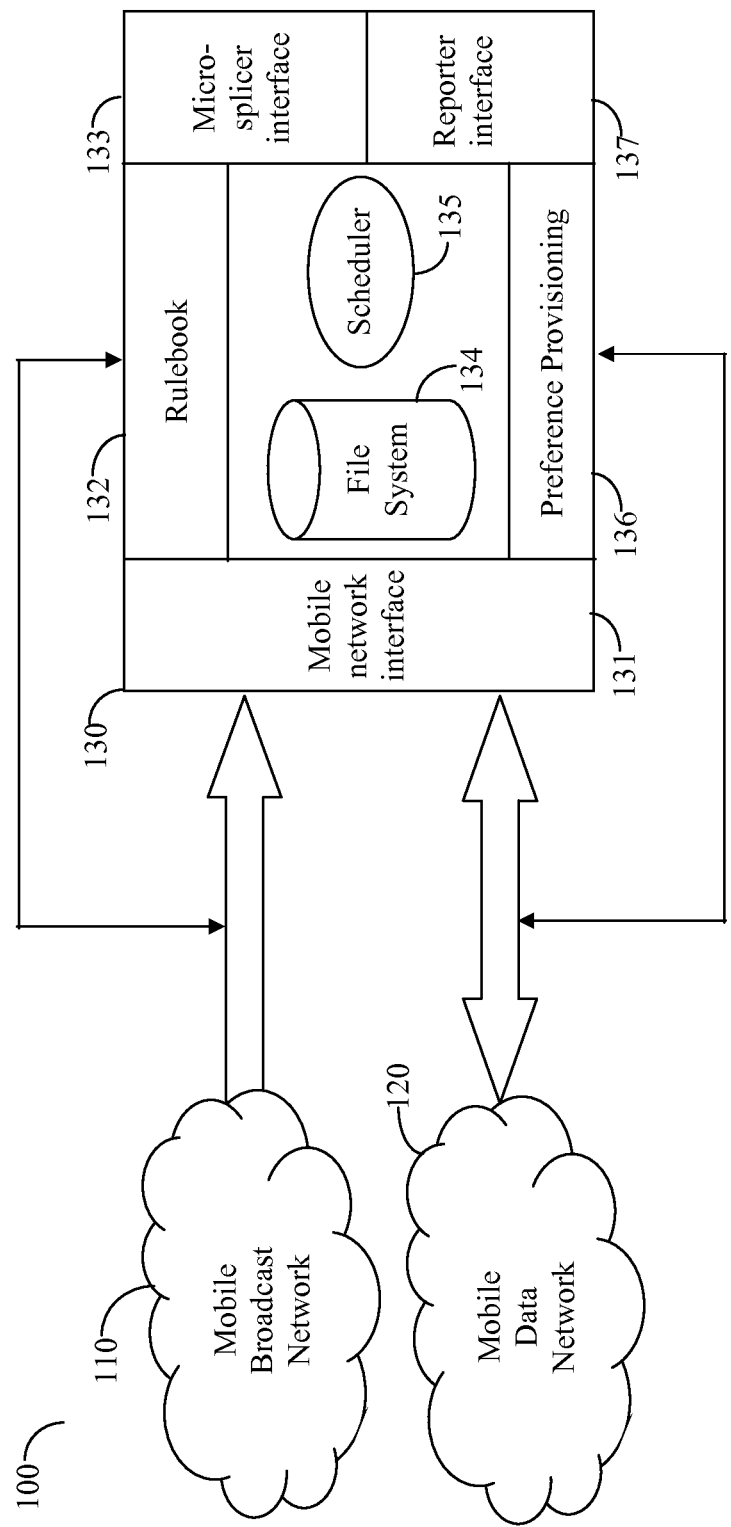
FIG. 1 illustrates the entities of alternate content scheduler according to the invention.
Figure 2:
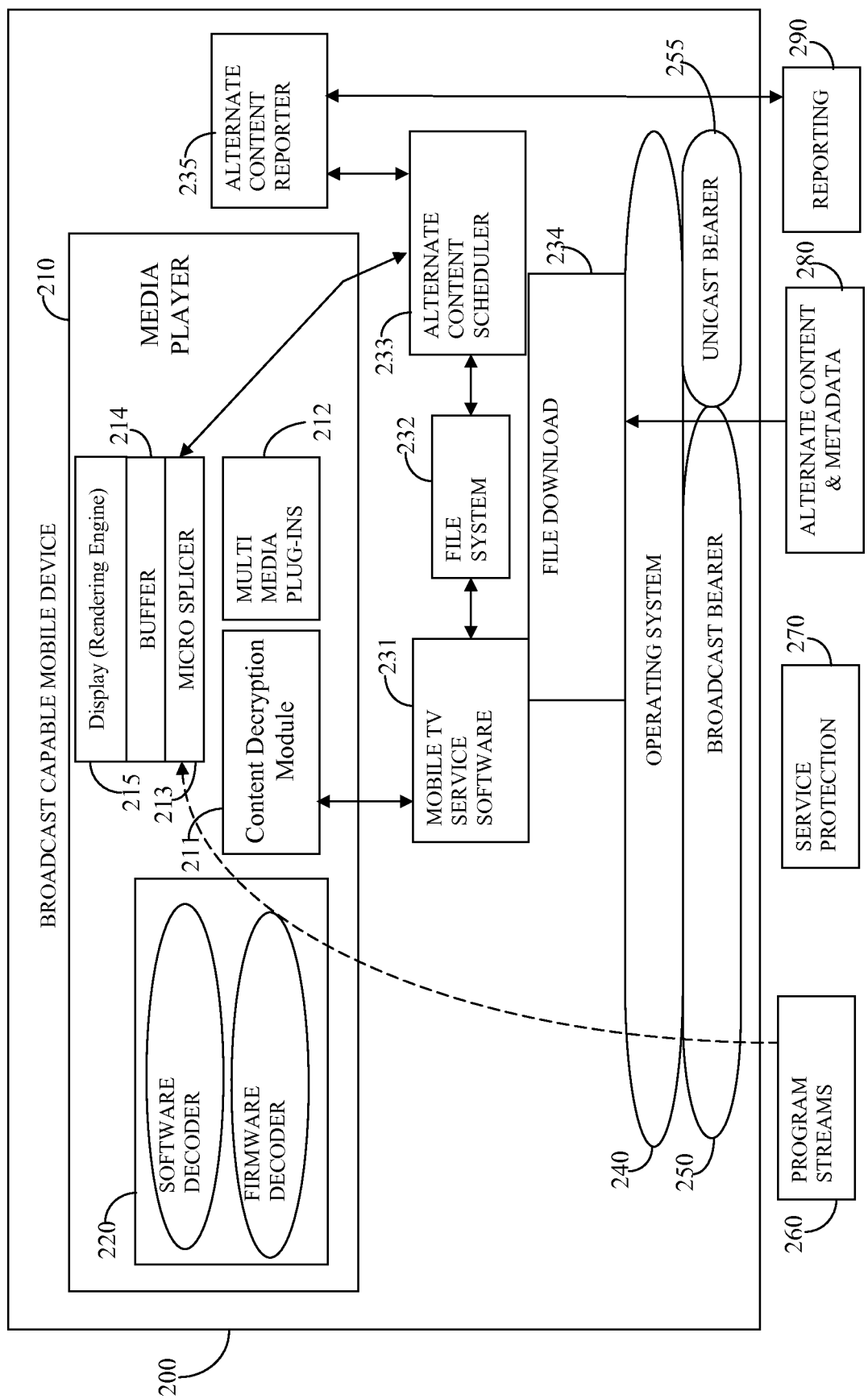
FIG. 2 illustrates the entities that participate in alternate content scheduling according to the invention.

FIG. 1 that illustrates a system 100 that includes an alternate content scheduler 130 and the entities that comprise the alternate content scheduler 130. A system for inserting alternate digital content into mobile devices comprises an alternate content scheduler 130 and a micro-splicer, e.g. the micro-splicer shown in greater detail in the '204 application. The alternate content scheduler 130 further comprises a mobile network interface 131 for interaction with a mobile data network 110 and a broadcast network 120, a micro-splicer interface 133 for interfacing with a micro-splicer, a rulebook 132 that provides rules for alternate content scheduling, a user preference module comprising an alternate content scheduler library 134 for storing user preferences, a scheduler 135 for providing tight synchronization between original program content and alternate content, a preference provisioning module 136, and an interface to an alternate content reporter 137. The micro-splicer works in tandem with the alternate content scheduler 130 to render synchronized display of multimedia content for the mobile media player. There are six components in a preference based alternate content scheduling embodiment of the invention:

1. Addressable content metadata for alternate content on the mobile device or preference based provisioning for the user is obtained from the network through well-documented point-to-point provisioning mechanisms, such as wireless access protocol (WAP), short message services (SMS), or hyper text transfer protocol (HTTP). The alternate content may also be obtained through selective reception over mobile broadcast or IP multicast transport. The alternate content scheduler software on the mobile device must have access to these user preferences;

2. The rulebook 132 is the set of protocol for alternate content insertion. The rulebook is responsible for the definition of alternate content categories, scheduling times, type of content, interaction with a Mobile TV service system, etc. The alternate content scheduler library 134 obtains the rulebook and receives updates from the network through point-to-point mechanisms, such as WAP, SMS, or HTTP;

3. The scheduler 135 is a core component that enforces the rulebook 132 for alternate content rendering on the mobile device, while providing the user experience and tight synchronization between original program content and alternate content;

4. During interaction with mobile networks, alternate content, the rulebook, and the associated metadata that represent the rules for inserting the content may be obtained either through interactions with Mobile TV service system on the mobile device or proprietary mechanisms;

5. Working in tandem with the micro-splicer to render synchronized multimedia content for the mobile media player to display; and
6. Alternate content reporting interface to record alternate content viewer-ship on the mobile device FIG. 2 is an architectural illustration that shows the entities participating in alternate content scheduling. The main entities of the micro-splicing architecture are the alternate content scheduler 233, alternate content reporter 235, and the micro-splicer 213. Components of the architecture are described in detail in the '204 application, illustrating in detail the method of inserting alternate digital content into multimedia content broadcast to mobile portable devices.

The alternate content scheduler 233 receives alternate content and related metadata over a mobile operator provisioned transport network. The alternate content scheduler 233 helps synchronize content switching on the mobile device by notifying the micro-splicer 213 of the impending spot break program switch, inlay, or overlay command for inserting alternate multimedia content. The alternate content reporter 235 is a module on the mobile device that is responsible for recording and reporting of alternate content viewer-ship. The alternate content scheduler 233 interacts with the reporter 235 through an internal interface.

When a Mobile TV service is enabled for the mobile device, program streams start flowing from the broadcast channel into the mobile device. The Mobile TV service library on the mobile device conveys the Internet protocol (IP) address and port to render the content to the mobile media player. The micro-splicer 213 conveys the program stream information to the alternate content scheduler library 232 for channel specific alternate content insertion. The alternate content scheduler 233 can also obtain program information by interfacing with the Mobile TV service 231 software on the mobile device. The alternate content scheduler library 232 stores the alternate content and corresponding metadata obtained from broadcast or unicast channel on the mobile device file system prior to any insertion. If the alternate content is encrypted, the alternate content scheduler 233 uses the subscription profile on the mobile device to acquire the keys required for decrypting before rendering.

Preference provisioning is an important ingredient for alternate content insertion. Preference based storefront rendering, localized public announcements and emergency notifications, profile and category based advertisement insertions, and replacing original content with alternate content for a specified period of time all require the user to specify the choice of alternate content through mechanisms available on the mobile device. The alternate content scheduling service, i.e. the network and mobile device, keeps the rulebook component in synchronization with user preference provisioning so that the user can view the latest options available at any point in time.

The rulebook 132 is the protocol between the network and the mobile device for enforcing policy or rule based alternate content scheduling. In a preferred embodiment, it is created in an extensible markup language (XML), such as a schema that denotes the categories of alternate content available for selection, mandatory categories association between categories and channels in the Mobile TV service, the duration of alternate content, time synchronization in terms of absolute or relative time between the network and the mobile device for alternate content rendering, and the type of alternate content insertion and sub-categories.

The scheduler 135 is key to the alternate content scheduler 200 (130) architecture and manages the following functions:
  Selective reception and storage of alternate content on the mobile device;
  Keep the rulebook on the mobile device in synchronization with the network;
  Convert preferences into executable metadata for alternate content insertion;
  Monitor the channels viewed by the user and map appropriate alternate content based on channel information, preferences, and priorities;
  Interact with the micro-splicer 213 before, during, and after alternate content insertion;
  Interact with the mobile networks 110, 120 to keep alternate content and metadata up to date;
  Time synchronize alternate content insertion per rulebook entries and user preferences;
  Honoring alternate content priorities and executing insertion of the same; and
  Refresh the file system 232 (134) periodically based on rulebook entries. Keep the storage on the mobile device file system to operator provisioned watermarks.

The rulebook 132 is the shared entity between the network and the mobile device for dynamic addressable alternate content insertion on the mobile device. The mother alternate content scheduler in the network defines the rulebook with interactions through mobile TV service provisioning, alternate content insertion Service Level Agreements (SLAs), and mobile TV service delivery mechanisms. Rulebooks can vary with the topology of the Mobile TV service delivery network.

Depending on the type of Mobile TV network, geography specific rulebooks need to be applied on the mobile device for appropriate alternate content insertions in the specified locations. The rulebook is defined, for example, in XML format and can be similar to the moving picture experts group-7 (MPEG-7) syntax used in the Digital Video Broadcast-Convergence of Broadcast and Mobile Services (DVB-CBMS) specifications. Typically an element is defined in the node per alternate content type, its channel or IP Address association, type of alternate content which can be video, audio, or banner, type of insertion which can be bumper, gateway, forced, interstitial, size of the file, number of insertions per channel per defined unit of time, time synchronization with program start, and URL for accessing the alternate content for file repair.

Figure 3:
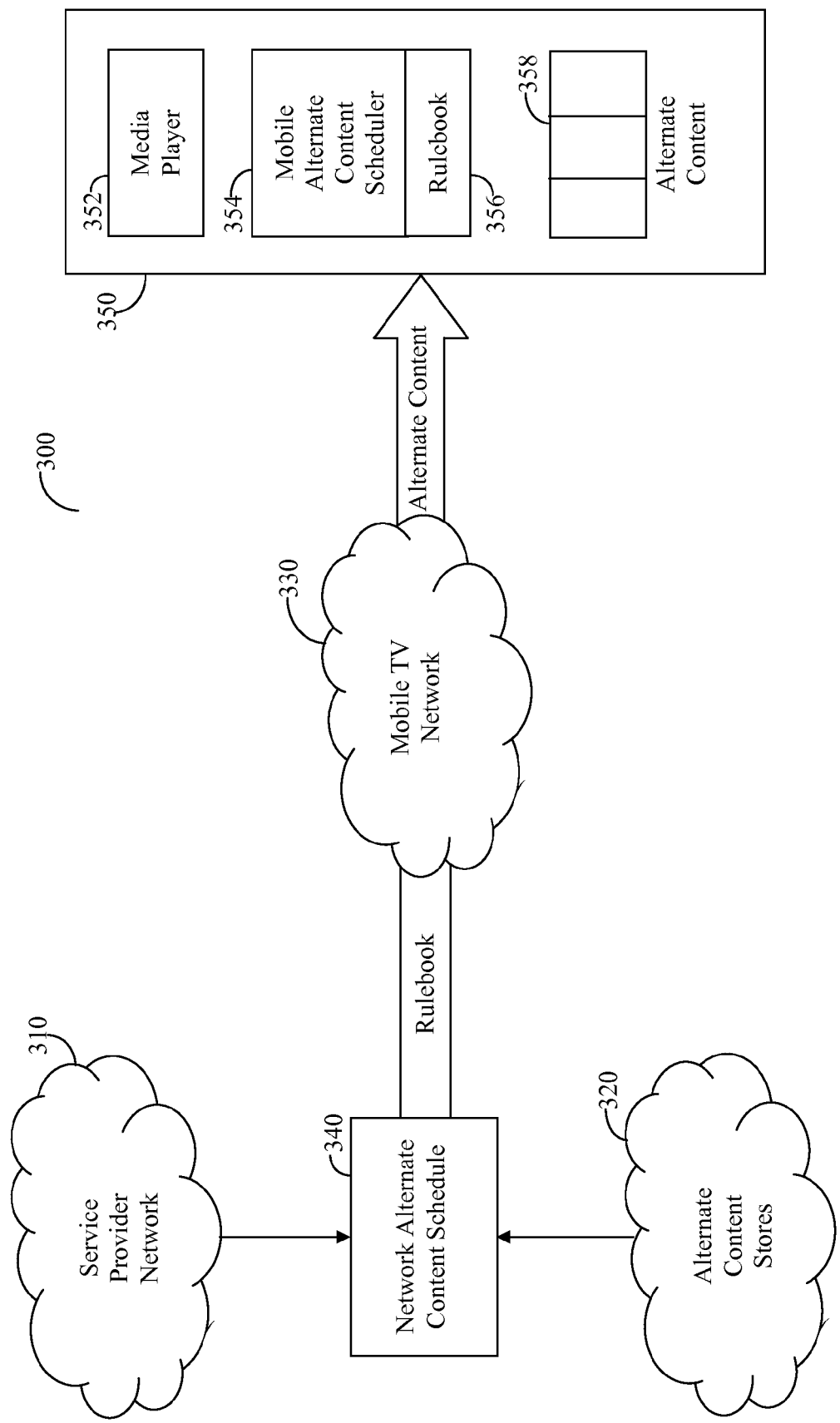
FIG. 3 illustrates an alternate content scheduler rulebook for a single frequency network according to the invention.

FIG. 3 illustrates a system 300 with the alternate content scheduler rulebook 356. A single frequency network (SFN) mobile TV service delivery topology and a single rulebook is shared between the networks 310, 320 and all the mobile devices, e.g. mobile device 350, enabled for the service.

Figure 4:
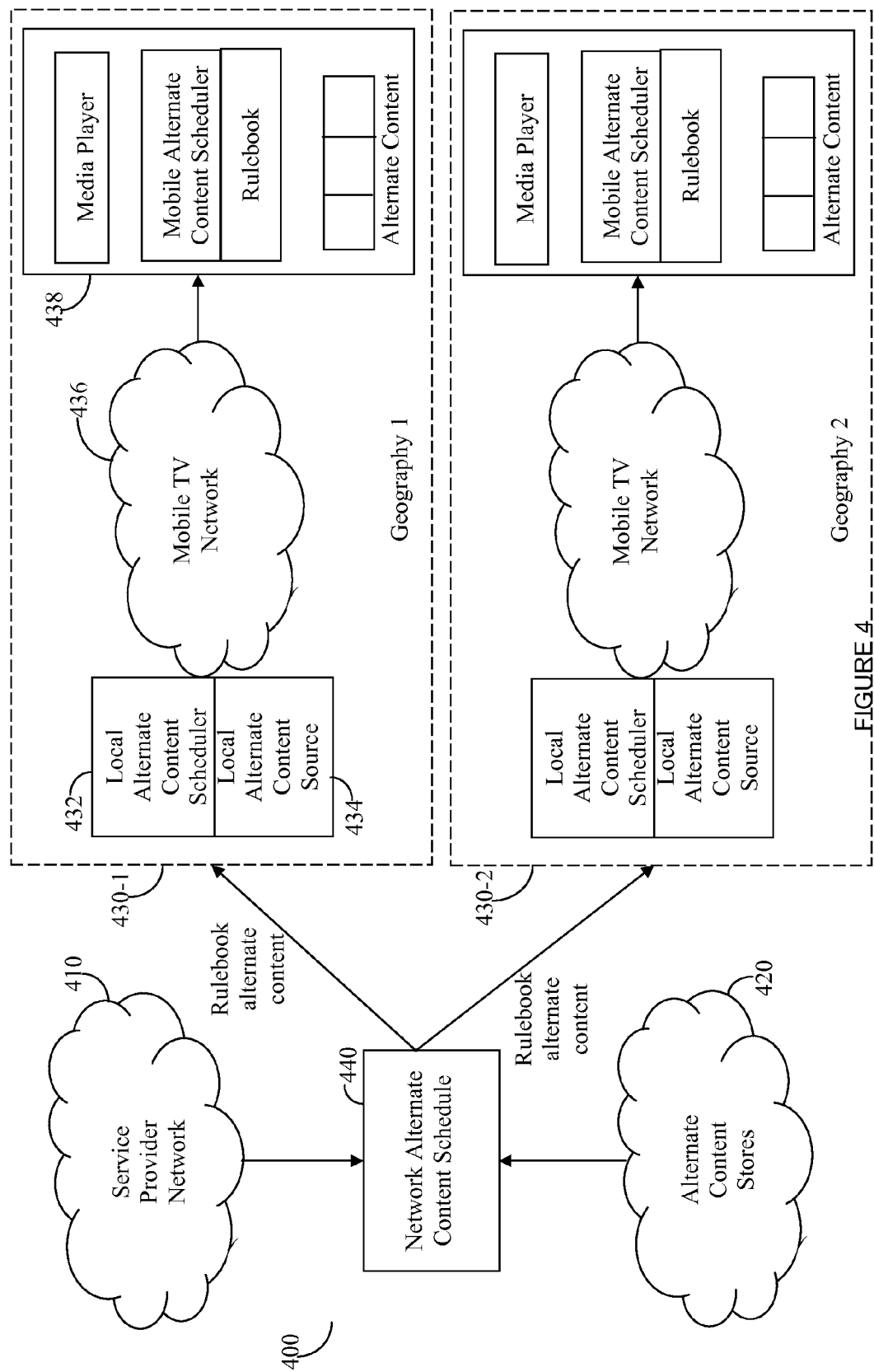
FIG. 4 illustrates an alternate content scheduler rulebook in a multi-frequency network according to the invention.

FIG. 4 shows a system 400 where the alternate content scheduler is a geography based rulebook. Each system 430 has its own rulebook. The localized rulebooks are sent to different mobile devices, e.g. device 438 of system 430-1, in different geographies. In such a case, the alternate content sources 432, 434 that need to be served for the few localized insertions are added to the rulebook and broadcast to mobile devices. The scenario is typical of multi frequency network (MFN) topology of mobile TV service delivery. An example of an MFN topology is generic vs. local content, where the mother alternate content scheduler 440 controls the rulebook elements for generic content while the local scheduler, e.g. the scheduler of device 438, controls the geography specific content.

Alternate content scheduler interactions with the mobile networks are specified by a network operator and are part of the rulebook shared by the network and the alternate content scheduler. The rulebook is obtained through an implementation dependent bootstrap process, and is regularly updated as per specifications in the rulebook. Transport channel information, alternate metadata information, reception of alternate content, program swaps, and related information are enforced by the alternate content scheduler, as specified in the rulebook.

Alternate Content Insertion During Live Programs

There are scenarios in alternate content insertion, such as broadcast of live program content, that require additional intelligence on the alternate content scheduler to pre-buffer alternate content ahead of the impending break. The network may or may not have the ability to acquire and transmit the information about the impending spot break or slot for alternate content in a timely fashion, and/or the mobile device may not be able to tune into the transport stream quickly enough to render the metadata and inform the micro-splicer of the break. In such cases, the micro-splicer starts pre-buffer of the alternate content as soon as the program content streaming begins and looks for the command to insert alternate content. The scheduler plays the role of a facilitator of content in such cases.

Priority Based Scheduling

The alternate content scheduler is very useful in performing priority based scheduling on the mobile device. Higher priority alternate content scheduled in the network can arrive at the mobile device through multiple transport channels, such as SMS, cell broadcast, mobile data network, mobile access network, etc. and supersedes lower priority alternate content. A typical example of priority based scheduling is the announcement of valuable public safety information and emergency notifications, or even multimedia based on user preferences. In such cases, the scheduler renders the higher priority alternate content in conjunction with the micro-splicer, either during the insertion time or by forcing the alternate content in place of the original program streams being rendered.

The alternate content scheduler maintains a master-slave relationship with the micro-splicer. The alternate content scheduler helps synchronize content switching on the mobile device by notifying the micro-splicer of the impending spot break or program switch, inlay, or overlay command for inserting alternate content. The micro-splicer, in tandem with the alternate content scheduler, switches back to the original program streams once the alternate content is rendered.

Addressable content provisioning on the mobile device is performed either by providing the necessary user interface or by network-initiated push based on operator considerations. The addressable content provisioning is done on a per-channel basis that corresponds to media stream received on a given IP address or for groups of channels or for the entire mobile TV service channels.

Figure 5:
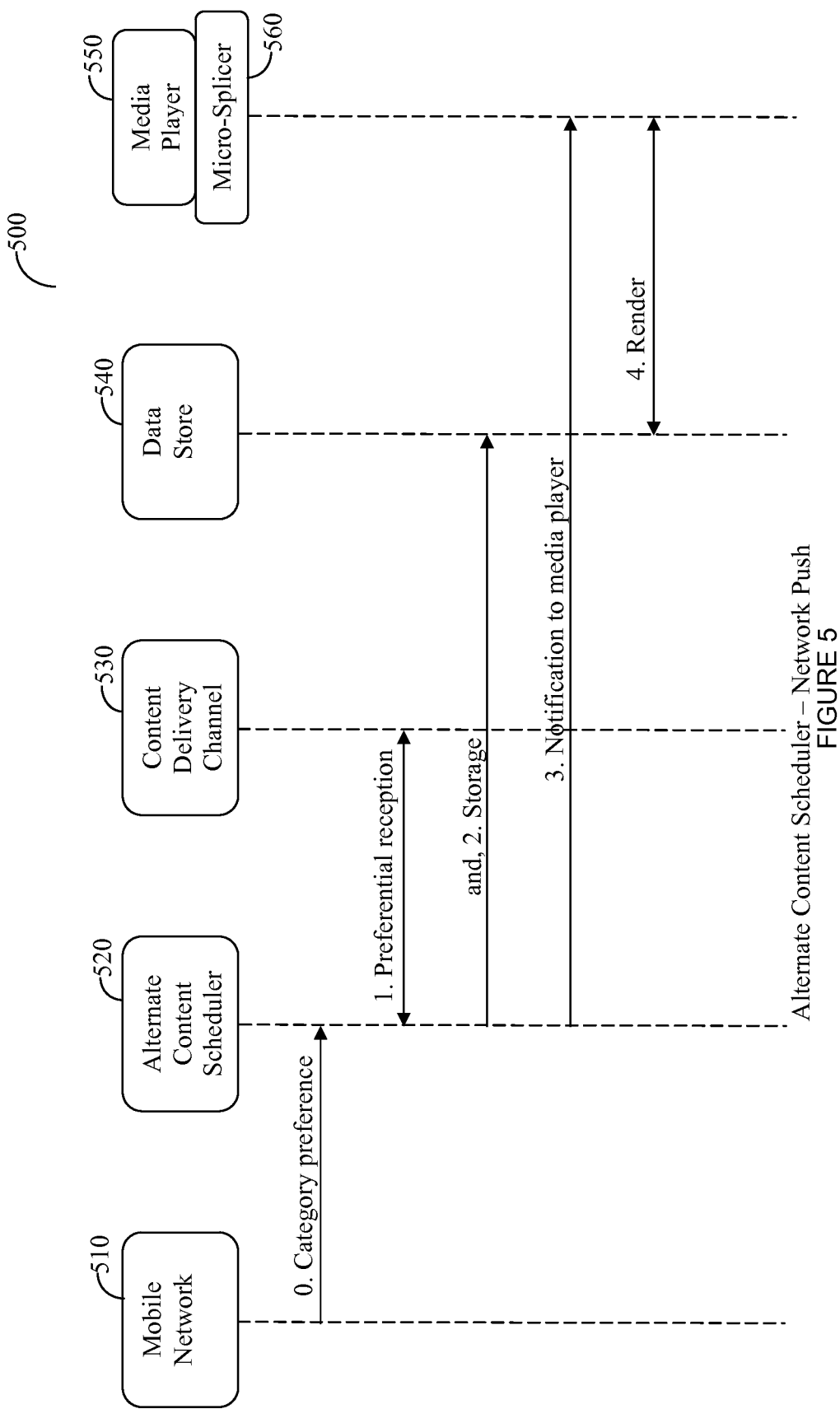
FIG. 5 illustrates addressable alternate content provisioning through user interface on mobile device according to the invention.

FIG. 5 illustrates the preference provisioning steps in a network initiated push. The following takes place:
  Mobile network 510 pushes the addressable alternate content preferences through well document point-to-point delivery mechanisms, such as HTTP, WAP, or SMS;
  The alternate content scheduler 520 selectively receives the alternate content through provisioned content delivery channels 530, based on the preferences;
  These preferential alternate content files, along with the preferences, are stored in the local data store 540;
  An alternate content scheduler 520 notifies the micro-splicer 560 of the file location during insertion time; and
  Rendering of the alternate content takes place.

Figure 6:
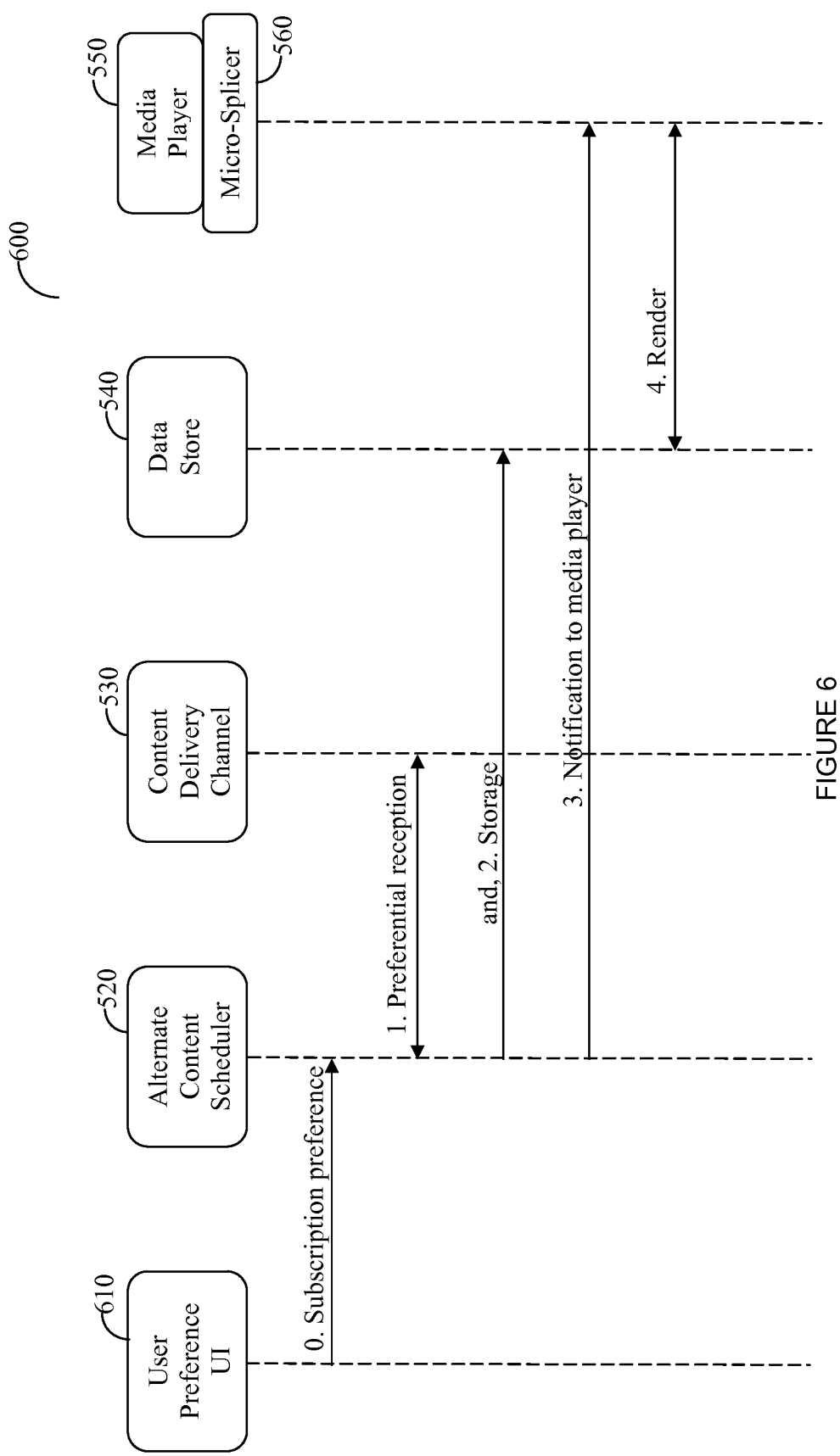
FIG. 6 illustrates addressable alternate content provisioning through network initiated push according to the invention.

FIG. 6 illustrates preference provisioning through the user interface on a mobile device. The following takes place:
  A user initiates the preferential alternate content provisioning through the provided user interface 610 on the mobile device;
  The alternate content scheduler 520 selectively receives the alternate content from the provisioned content delivery channels 530, based on the preferences;
  These preferential alternate content files, along with the preferences, are stored in the local data store 540;
  An alternate content scheduler notifies the micro-splicer 550 of the file location during insertion time; and
  Rendering of the alternate content takes place.

There are some tricky scenarios during the Mobile TV service delivery, such as a user joining the service during the alternate content insertion time. In addition to preference or category based provisioning, the Mobile TV service operator must also provision rules, such as users joining the service during alternate content insertion time. These rules can be set per channel watched or for a group of channels (package). Examples of rules are:
  a. Always render alternate content when the user joins service; and
  b. Never render alternate content if the user joins the service during insertion time.

Figure 7:
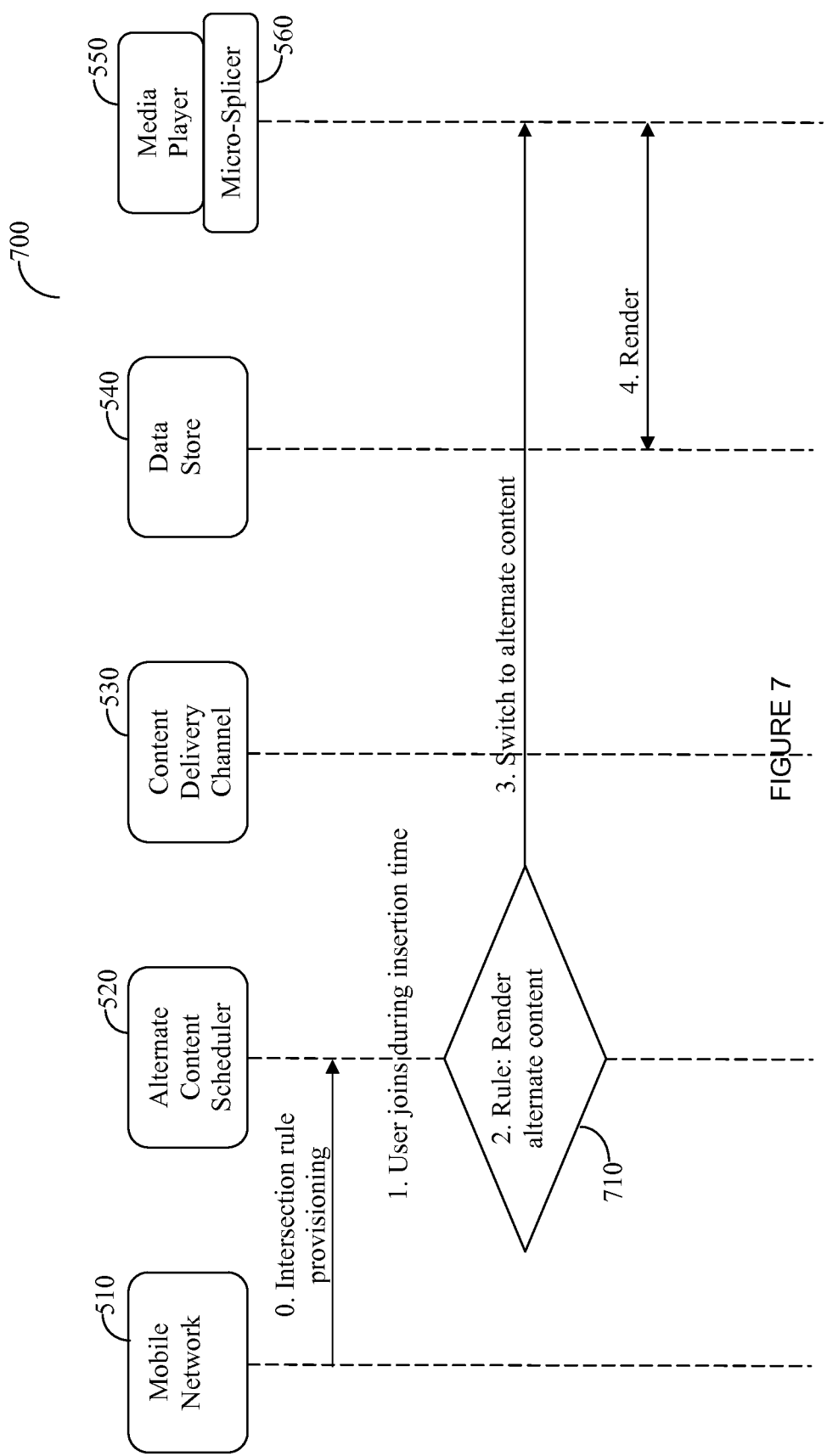
FIG. 7 illustrates alternate content insertion policy provisioning according to the invention.

FIG. 7 illustrates a message flow typical of the provisioning and the subsequent rendering of alternate content. The following takes place:
  A policy for alternate content insertion is provisioned into the alternate content scheduler 520 through well document mechanisms, such as SMS or HTTP.
  A user joins during insertion time;
  An alternate content scheduler 520 checks the provisioned policy to render alternate content always if a user joins during insertion time;
  The alternate content scheduler 520 instructs the micro-splicer 560 to switch to alternate content; and
  Rendering of the alternate content takes place before switching to original program content.

The alternate content scheduler on the mobile devices interacts with the mobile data networks 110, 120 for various activities. A typical example of the scenario involves interactive content, where the alternate content invokes a point-to-point data connection between the mobile device and the network. Support for retrieving alternate content during loss of some transport channels might necessitate means of obtaining the content needed for insertions. Another important function of the alternate content scheduler is to record the alternate content viewer-ship to the alternate content reporter.

Alternate content scheduling is applicable for many different contextual rendering of content streams. Mobile TV is one of the applications where a dynamic advertisement insertion for targeted users is beneficial to all the stakeholders in the value-chain. Similarly, storefront applications, emergency notifications, and public announcements can be scheduled on an ad hoc basis in the network.

Optimizations and enhancements such as, but not limited to, multiple transport networks delivering alternate content well in advance of program content, are accommodated through the alternate scheduling mechanism described herein. The optimization techniques, such as reception of selective alternate content based on user viewer-ship of program content, time of the day, geography, are extremely useful in providing valuable services to the subscriber, and also enable mobile service providers to use the bandwidth efficiently for alternate content delivery, while maximizing the revenues from the Mobile TV service deployments.

In summary, therefore, a first embodiment of the invention inserts advertisements on the mobile device. Advertisements are transmitted and stored in the mobile device for insertion into the micro-splicer at an appropriate time. Though the method of transmission of the advertisements can vary depending on the transport characteristics of wireless data or broadcast networks, insertion of advertisement content is dependent on tight coupling of the micro-splicer and the alternate content scheduler. Inserting gateway, interstitial, bumper, or banner advertisements in the content buffer is an example of the interaction.

Another embodiment of the invention inserts preferential content, based on subscriber choices on the mobile device. Content obtained through transport channels or residing on the mobile device is inserted based on subscriber preferences.

Yet another embodiment of the invention inserts public broadcast announcements into the program streams with appropriate metadata interactions. Emergency notifications are another form of forced alternate content that is inserted into the user display by network scheduled high priority content delivery, which is implemented by the alternate content scheduler to be executed by the micro-splicer.

Another embodiment of invention involves mobile product placement, wherein appropriate metadata notifications to the alternate content scheduler trigger placement of images or multimedia on the specified region of the display of the mobile device through interactions with the micro-splicer.

Yet another embodiment of invention enables mobilization of advertisements inserted in the network by making them mobile friendly with the insertion of targeted, e.g. contextual, location based, or behavior oriented, interactive segments around the advertisements embedded in the content streams. This involves the use of metadata for timing and synchronization, along with creation of these dynamic interactive segments during the time in which the specific advertisement is rendered. The alternate content scheduler, in tandem with the micro-splicer, achieves this using predefined metadata made available in the content streams.

Another embodiment of invention concerns advertisement fatigue control which, in essence, controls the number of times any given ad should be viewed by the user in a specified time period. Typically, ad inventory owners want to set the ad fatigue in the network, thereby limiting the number of times an ad is viewed by an user in a given time period. The alternate content scheduler helps in ad rotation, as well as fatigue control, through the use of a rulebook that is shared between the network and the mobile device.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

The invention claimed is:

1. An apparatus for inserting alternate content into a content stream displayed on a mobile handheld device (HHD) comprising:
    a display for displaying alternate content of a plurality of targeted digital multimedia alternate content;
    wherein each alternate content of the plurality of targeted digital multimedia alternate content is associated with a plurality of attributes;
    wherein an attribute of the plurality of attributes specifies:
    a time synchronization option specifying that either absolute or relative timing should be used to synchronize said each alternate content with the content stream;
    a scheduler configured to evaluate a set of rules for selecting a particular alternate content of the plurality of digital multimedia alternate content for display on the mobile HHD at a particular time;
    wherein the set of rules are evaluated based at least on a value of the attribute of the particular alternate content;
    a switching mechanism, working in tandem with the scheduler, configured for switching from rendering original content to rendering the particular alternate content, and when rendering the particular alternate content completes, switching back to rendering the original content; and
    a mobile network interface for interfacing with the mobile HHD.

2. The apparatus of claim 1, further comprising a mobile network comprising any of:
    a mobile data network;
    a IP network
    a wifi network.

3. The apparatus of claim 1, wherein said set of rules for selecting targeted digital multimedia alternate content comprises local rules and global rules.

4. The apparatus of claim 1, further comprising a rulebook that comprises the set of rules received over the network.

5. The apparatus of claim 1, further comprising a targeting content library buffer on the mobile HHD for storing targeting information on the mobile HHD, the targeting information including any of customer preferences, characteristics, and network provisioning preferences.

6. The apparatus of claim 5, further comprising a preference provisioning module coupled to the targeting content library buffer for handling preferences pre-stored on the mobile HHD, the preferences comprising user of said mobile HHD preferences, or network provisioning preferences.

7. The apparatus of claim 6, wherein said network provisioning preferences comprise local network preferences; or global network preferences.

8. The apparatus of claim 1, further comprising:
    a reporter for recording metrics regarding the stored targeted digital multimedia alternate content.

9. The apparatus of claim 1, wherein said stored targeted digital multimedia alternate content comprises local digital multimedia content; or global digital multimedia content.

10. The apparatus of claim 1, wherein said scheduler comprises means for performing a rotation among the available stored targeted digital multimedia alternate content on the mobile HHD.

11. A method for inserting targeted digital multimedia alternate content into a content stream to be displayed on a mobile handheld device (HHD), comprising the steps of:
    storing a plurality of selectively received targeted digital multimedia alternate content on the mobile HHD;
    wherein each alternate content of the plurality of targeted digital multimedia content is associated with at least one attribute;
    wherein an attribute included in the at least one attribute associated with said each alternate content specifies:
    a time synchronization option specifying that either absolute or relative timing should be used to synchronize said each alternate content with the content stream;
    evaluating a set of rules for selecting a particular alternate content of the plurality of targeted digital multimedia content for display on the mobile HHD at a particular time;
    wherein the set of rules are evaluated based at least on a value of the attribute of the particular alternate content;
    switching from rendering and displaying original content to rendering and displaying the particular alternate content at the particular time, and when rendering and displaying the particular alternate content completes, switching back to rendering and displaying the original content.

12. The method of claim 11, further comprising:

pre-storing on the mobile HHD targeting information including any of customer preferences, characteristics, and network provisioning preferences on said mobile HHD.

13. The method of claim 12, wherein said preferences comprise preferences of the user of the mobile HHD, or network preferences.

14. The method of claim 13, further comprising providing said user preferences with a user interface.

15. The method of claim 12, further comprising selectively receiving by said mobile HHD based on said pre-stored mobile HHD targeting information using any available delivery mechanism.

16. The method of claim 15, wherein said any available delivery mechanism comprises any of:

HTTP;
WAP; and
SMS.

17. The method of claim 12, wherein said step of selectively receiving comprises receiving from an IP or mobile data network.

18. The method of claim 11, further comprising the step of:

rotating among the pre-stored targeted digital multimedia content.

* * * * *